(12) United States Patent
Tippetts

(10) Patent No.: US 7,305,936 B2
(45) Date of Patent: Dec. 11, 2007

(54) RETRACTABLE, RAMPED BIRD FEEDER

(76) Inventor: Mark W. Tippetts, 1075 County Rd. 782, Mountain Home, AR (US) 72653

(*) Notice: Subject to any disclaimer, the term of this patent is extended or adjusted under 35 U.S.C. 154(b) by 301 days.

(21) Appl. No.: 11/177,800

(22) Filed: Jul. 11, 2005

(65) Prior Publication Data
US 2007/0006811 A1    Jan. 11, 2007

(51) Int. Cl.
A01K 5/02 (2006.01)
(52) U.S. Cl. ..................... 119/52.2; 119/61.2
(58) Field of Classification Search ............... 119/52.2, 119/51.01, 52.1, 57.1, 57.6, 57.91, 57.92, 119/61.2
See application file for complete search history.

(56) References Cited

U.S. PATENT DOCUMENTS

| | | | | |
|---|---|---|---|---|
| 4,039,118 A * | 8/1977 | Kawaoka | ............... | 229/122.1 |
| 4,243,158 A * | 1/1981 | Negosta | ............... | 222/184 |
| 4,265,453 A * | 5/1981 | Loof | ............... | 473/134 |
| 4,592,494 A * | 6/1986 | Ellis et al. | ............... | 222/252 |
| 4,650,098 A * | 3/1987 | Ellis et al. | ............... | 222/252 |
| 4,834,263 A * | 5/1989 | Becze | ............... | 221/1 |
| 5,022,348 A * | 6/1991 | Bruecker et al. | ............... | 119/57.6 |
| 5,191,918 A * | 3/1993 | Cahlander et al. | ............... | 141/1 |
| 5,353,847 A * | 10/1994 | Cahlander et al. | ............... | 141/1 |
| D361,096 S * | 8/1995 | Shenk et al. | ............... | D21/372 |
| D373,511 S * | 9/1996 | Militzok | ............... | D7/589 |
| 6,405,674 B1 * | 6/2002 | Majewski et al. | ............... | 119/52.1 |
| 6,477,987 B2 * | 11/2002 | Taylor | ............... | 119/843 |
| 6,786,341 B2 * | 9/2004 | Stinnett et al. | ............... | 211/59.2 |

* cited by examiner

*Primary Examiner*—Yvonne R. Abbott
(74) *Attorney, Agent, or Firm*—Stephen D. Carver

(57) ABSTRACT

A bird feeder comprising a hopper suspended above ground by a hanger for holding granular bird seed, and a collapsible feed trough through which the seed flows. The trough consists of a series of pivotally interconnected ramps that unfold during deployment into a zigzag configuration. An uppermost ramp is fixedly secured to the hopper, and successive lower ramps are pivoted to each other in an angular "zigzag" arrangement. Each ramp is inclined relative to the horizontal approximately thirty degrees. Each ramp has a discharge hole at its lower end that is large enough for seed to fall through to a lower ramp. In response to vibration, seeds exit the hopper and travel through the trough. When the feeder is to be stored or shipped, the trough is collapsed by folding the ramps into a nested, retracted position.

16 Claims, 5 Drawing Sheets

RETRACTABLE, RAMPED BIRD FEEDER

BACKGROUND OF THE INVENTION

1. Field of the Invention

The present invention relates generally to hanging bird feeders. More particularly, the present invention relates to feeders that discharge dry bird seed through a lower trough that is connected to an upper hopper.

2. Description of the Related Art

A large variety of bird feeders are known in the art. Many comprise an upright hopper that is suspended from an elevated support such as a tree branch or the like by a suitable hook or clasp connected to the body. Often the hopper has a plurality of perches adjacent various outlet orifices disposed about the feeder periphery. The feed outlets may be simple holes, slits, screens, or gated openings that allow access to the stored feed. In some designs, there is a tray or other flat, planar surface adjacent the feed outlet upon which feed is deposited.

With typical designs, feed drops from the hopper through the outlet orifices in response to gravity. Some designs include chutes for guiding the food from the hopper to the serving area. One or more birds that land upon suitable perches for temporary support can then access and eat the food.

One problem is that much of the birdseed dispensed by typical feeders is concentrated in an irregular pile adjacent the hopper outlet. Even when feed drops into a lower tray or bowl, it tends to bunch up. If the feed were spread out evenly over a larger area, more birds would be able to concurrently visit the feeder, providing more entertainment or excitement for the feeder owner and others observing the feeder and its visitors.

Another problem with common bird feeders is that there is not enough physical separation between neighboring birds. Many less aggressive birds, for example, will postpone eating at a bird feeder until larger or more dominant species that are already there finish and fly off. However, if a bird feeder can somewhat isolate the birds from one another, and space out the regions upon which feed is placed, then more than several birds, often involving more than one species, will feel comfortable eating together.

BRIEF SUMMARY OF THE INVENTION

My invention is a convertible bird feeder that may be transformed between a feeding configuration and a collapsed, reduced volume shipping configuration.

The preferred feeder comprises a hopper for holding bird seed that is adapted to be suspended from at a suitable elevation by a tree branch, vertical support post or the like. A outlet orifice at the bottom of the hopper discharges bird seed, and it is large enough so that seed freely flows out. Seeds travel within a lower feed-trough mounted to the hopper adjacent the outlet orifice. The trough comprises a series of pivotally interconnected ramps that, when the feeder is deployed, are foldably arranged in a zigzag configuration. Each ramp forming the trough has sides that are high enough to prevent seed from spilling. An uppermost ramp is fixedly secured to the hopper, and successive lower ramps are pivoted to each other in angular "zigzag" directions. In other words, each ramp element angularly projects downwardly in a direction opposite from the ramp above it. In the best mode, several similar ramps are used, and each is preferably inclined relative to the horizontal approximately thirty degrees. Each ramp has a discharge hole at its lower end that is large enough for seed to fall through. The ramps are spaced such that seeds dropping from the end of one ramp downwardly to the front area of a lower ramp are not blocked by the angled trough structure.

In response to vibration, seeds exit the hopper and travel downwardly through the trough between successive ramps. Vibration occurs, for example, when birds land on the feeder, peck at the feed, or when the wind blows. Ramp vibration causes seeds to flow downwardly within the trough. Seeds pass through a particular ramp and reach the exit hole, whereupon they drop downwardly and enter the next succeeding ramp. The resultant seed flow progresses slowly as long as the hopper contents lasts, as seed is gradually eaten by the birds. The final ramp does not have an exit hole. The zigzag shape of the deployed trough is maintained by mechanical stops that limit pivoting between upper and lower ramps.

Preferably, when the feeder is deployed, each ramp pivots enough to establish an angle between ramps of approximately sixty degrees. When the feeder is to be stored or shipped, the trough is simply folded together or collapsed, at which time the ramps pivot into a nested, retracted position.

Thus a basic object is to provide a bird feeder that is lightweight and compact for shipping, but which can be erected simply by unfolding.

In other words, it is an object to provide a bird feeder of the character described that is readily transformed between an operational or deployed configuration, and a more compact, reduced-volume shipping or storage orientation.

Another object of my invention to provide a weatherproof bird feeder that protects the food from snow, rain, wind or ice.

It is also an object of this invention to provide a bird feeder that outputs seed and food along and within an elongated and angled feeding trough, so that multiple birds will feel comfortable at the feeder at once.

Another object is to provide a feeder of the character described that is only minimally affected by squirrels.

It is another important object of my new invention to provide a bird feeder that distributes its feed over a relatively large area so several birds can eat at once.

Another important object is to provide an area for presenting food to the birds that somewhat separates or isolates individual birds from one another. It is a feature of the invention that birds landing upon the feeder are spaced apart horizontally and vertically because of the zigzag trough design employed.

A related object is to provide a bird feeder that attracts several feeding birds at once.

A further object is to provide a new and improved bird feeder of the character described that may be economically shipped to customers. It is an important feature of my invention that the feeder can be retracted into a low volume, shipping configuration.

A further object is to provide a feeder that can be easily disassembled for cleaning.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
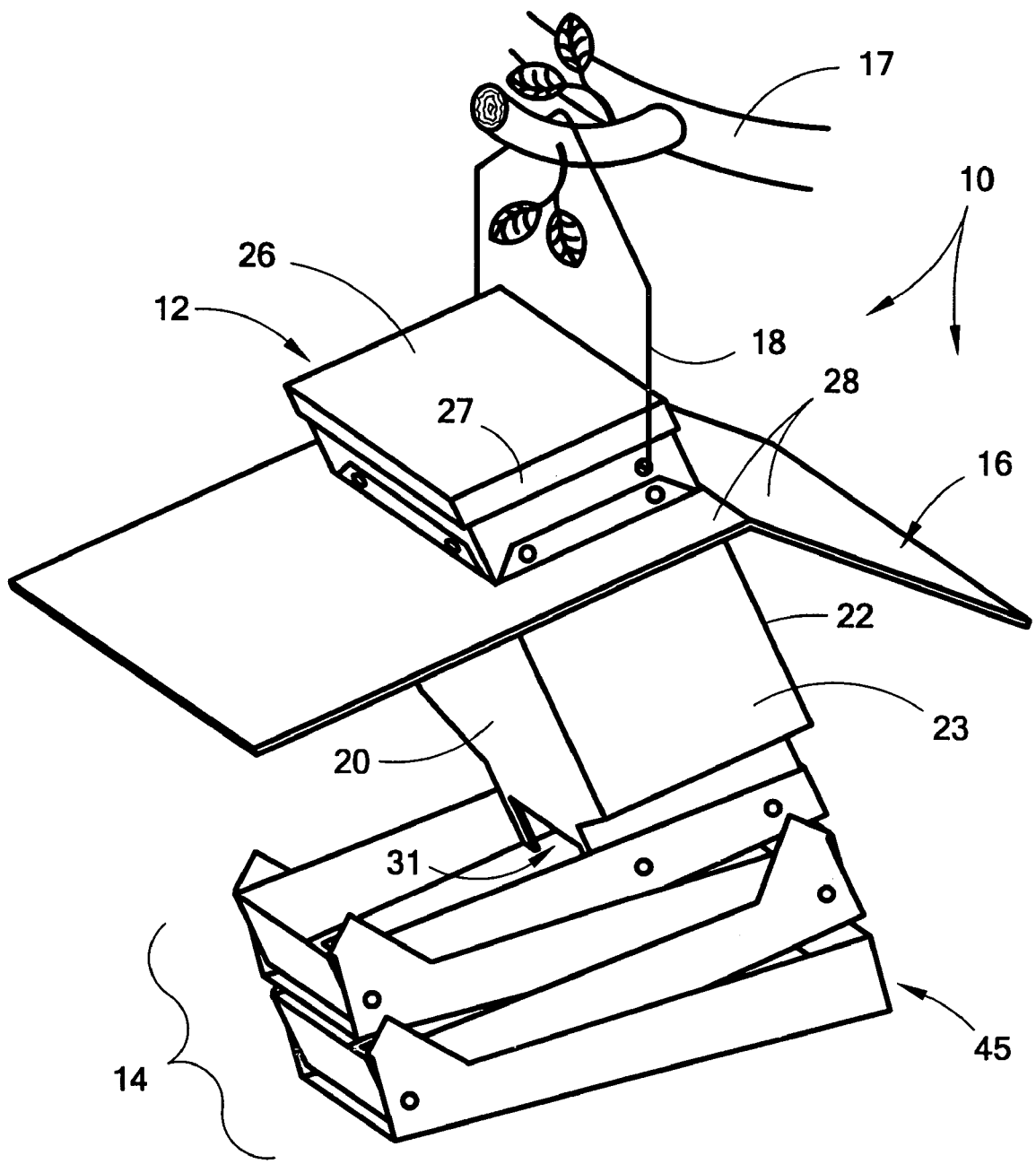
FIG. 1 is an isometric view of my new bird feeder, showing it in the compact, retracted position with the trough collapsed.

With initial reference directed the appended drawings, an animal feeder constructed generally in accordance with the best mode of the invention has been generally designated by the reference numeral 10. While the feeder is designed primarily for birds, it will be appreciated that other animals may feed upon it as well. Feeder 10 comprises a rigid hopper 12, which is generally in the form of a parallelepiped, that primarily holds bird food, such as seed mixtures or the like. Seed is dispensed from the hopper 12 into a lower feeding trough 14 connected to the hopper bottom. As explained in detail hereinafter, trough 14 comprises several, separate pivoted ramps. A generally planar, two-piece canopy 16 mounted atop the hopper shields the feeder from the elements. The feeder is suspended above ground from a suitable support by a hanger 18. As described in detail hereinafter, the feeder 10 is seen in a retracted orientation in FIG. 1, with the feed trough collapsed. Before use, the trough 14 is expanded or unfolded, as seen, for example, in FIGS. 2-5.

Hopper 12 has a generally rectangular side profile. As best seen in FIG. 1, hopper 12 has a front 20, a rear 22, a left side 23, and a rear side 24, all of which are generally rectangular. The interior 25 (FIG. 3) of the hopper 12 is normally filled with bird food comprising miscellaneous seeds or the like that are well known in the art. Interior 25 is preferably covered by a removable top 26, whose downwardly projecting, peripheral edges 27 snugly border the hopper's front, rear, and sides when installed. Preferably the canopy 16 is inclined by folding it angularly along its width, forming separate integral panels 28.

Figure 2:
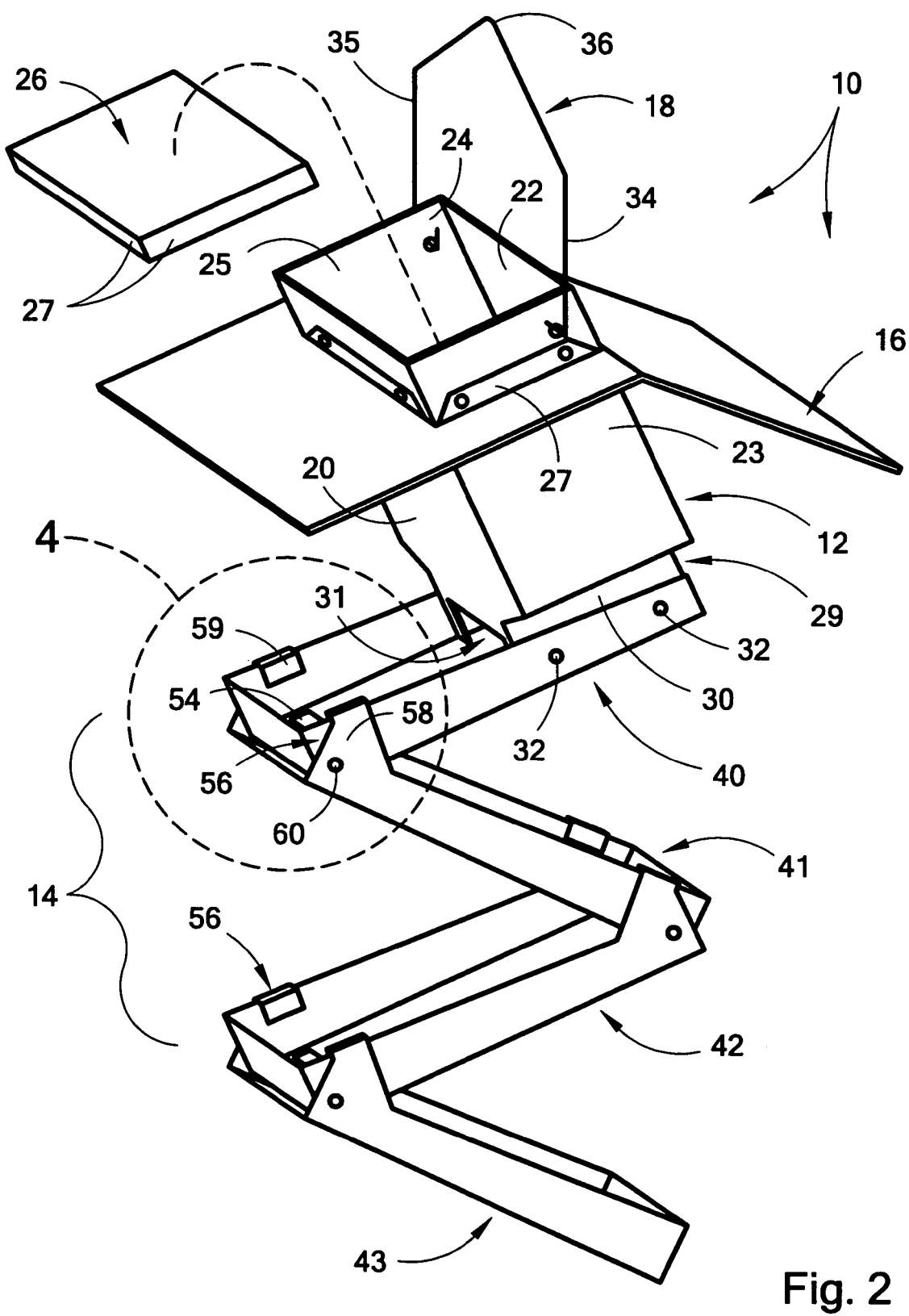
FIG. 2 is a partially exploded, isometric view of the feeder deployed, with the trough unfolded.

An integral, lower portion of the hopper 12 has been generally designated by the reference numeral 29 (FIG. 2); The smaller hopper portion 29 has edges 30 resting within trough 14, that are secured by fasteners 32. Hopper portion 29 has a generally rectangular, feed outlet orifice 31 defined in the bottom of its front 20. Feed escapes outlet orifice 31 in response to gravity, and enters the trough 14, for travel downwardly.

Hanger 18 has a pair of integral, spaced apart, inwardly turned sides 34, 35 that respectively penetrate suitable orifices defined within hopper sides 23, 24. The integral, V-shaped tip 36 of hanger 18 engages a support such as branch 17 (FIG. 1) or similar vertically elevated structure. As detailed in FIG. 5, the angular orientation of the hopper, and thus the incline of the outlet 31, is established by properly placing the hanger ends to establish a proper orientation for reliably discharging feed.

Preferably, feed trough 14 comprises a plurality of individual ramps that are foldably deployed in a zigzag fashion. An uppermost ramp 40 is not pivoted; it is secured to the underside of the hopper as aforesaid with fasteners 32. The intermediate ramps 41-44 and the lowermost ramp 45 are quite similar, but not identical. Each ramp has a pair of elongated, spaced apart sides bordering an inner, confining surface for feed. For example, ramp 40 (FIG. 3) has elongated, parallel sides 46 and 47 arrayed alongside a lower, inner surface 48 upon which food 49 such as bird seed (i.e., FIG. 3) sidably flows. Ramp sides 46 and 47 extend between an output end 50 and an innermost input end 52. The sides provide an adequate perch for most birds. Importantly, there is a feed discharge orifice 54 defined proximate the output end of each ramp 40-44; however, the lowermost or last ramp 45 which is pivoted to the bottom intermediate ramp 44, has no discharge orifice.

While the inner end of top ramp 40 is secured to the underside of the hopper, the input end of each of the other ramps 41-45 has a pair of upwardly projecting stops, generally designated by the reference numeral 56. With primary reference now directed to FIGS. 2 and 4, stops 56 include an angularly raised portion 58 that is generally in the form of a truncated pyramid that extends up over the ramp sides. An integral hook 59 with a profile like that of an inverted "U," engages opposite sides of the ramp above upon maximum deflection. In other words, stops 56 limit ramp pivoting, as the hooks forcibly contact the sides of the upper ramp when a lower ramp has pivoted maximally, reaching its extreme angular position. Suitable fasteners 60 pivotally interconnect succeeding coupled ramps.

In FIG. 1 the trough 14 is compacted, with each of the successive ramps folded together such that the feeder 10 assumes the minimal possible volume for shipping or storage. However, when the feeder is deployed, the trough ramps are unfolded for deployment, and they may assume the zigzag configuration of FIGS. 2-4. Importantly, an angle 64 (FIG. 4) between adjacent ramps is established by the stops 56. Noting FIG. 2 for example, a lower ramp assumes an angle by rotating as far as possible until its stops 56 contact the edges of the ramp above it. Hooks 59 that firmly cradle the sides or edges of a higher ramp firmly limit rotation by direct physical contact.

Figure 3:
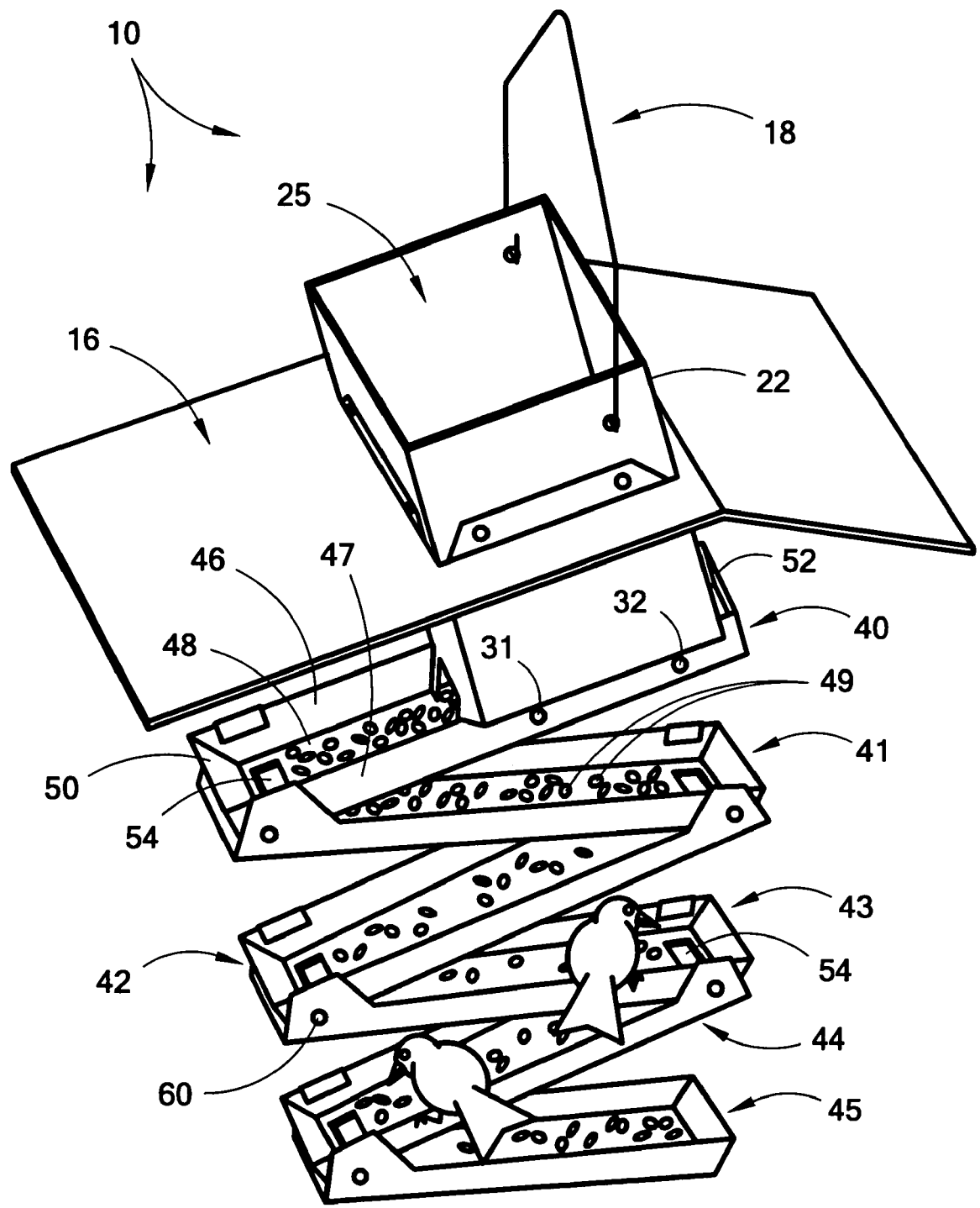
FIG. 3 is a top isometric view showing the trough interior.
Figure 4:
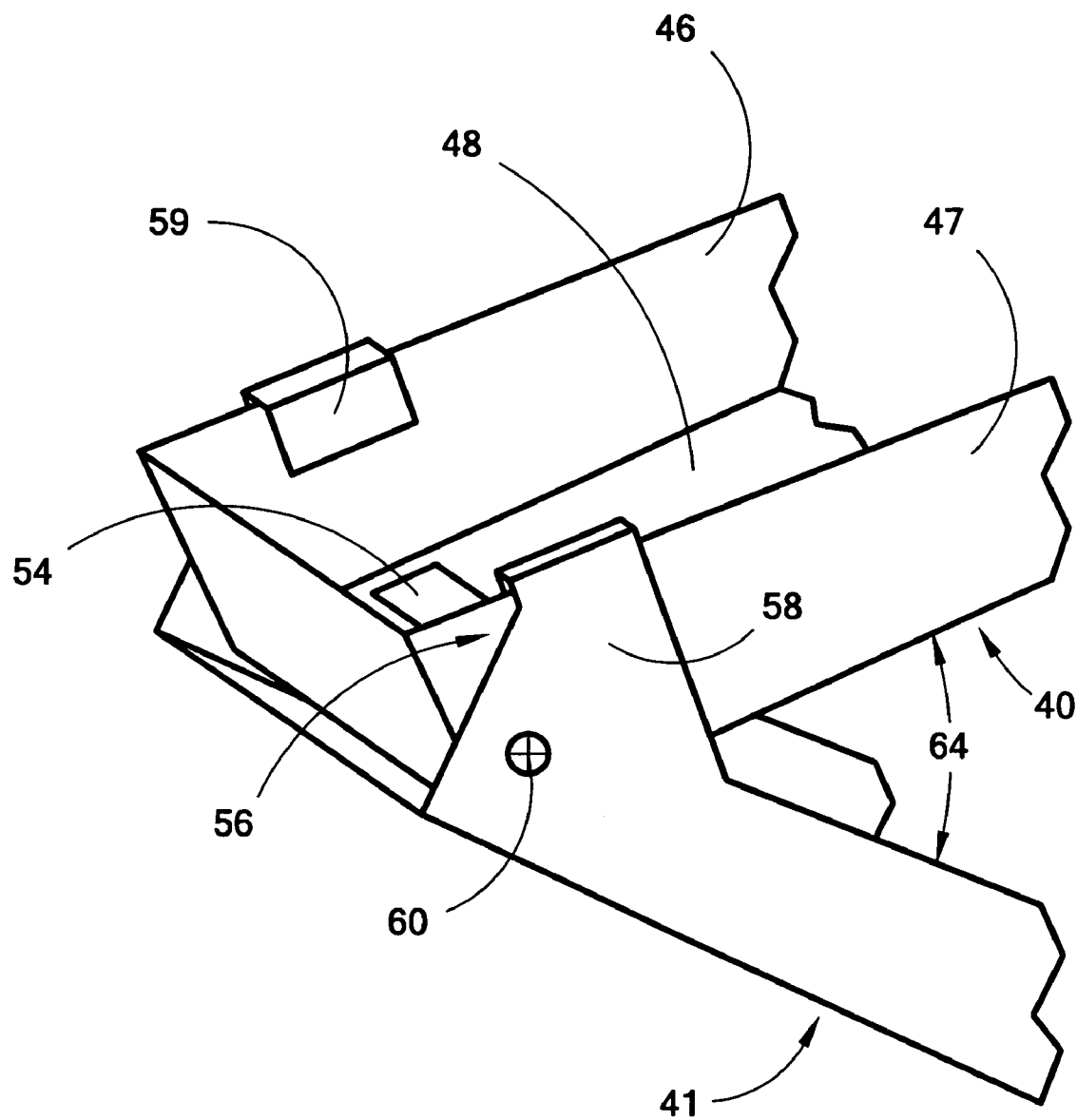
FIG. 4 is an enlarged, fragmentary isometric view of circled region 5 in FIG. 2.
Figure 5:
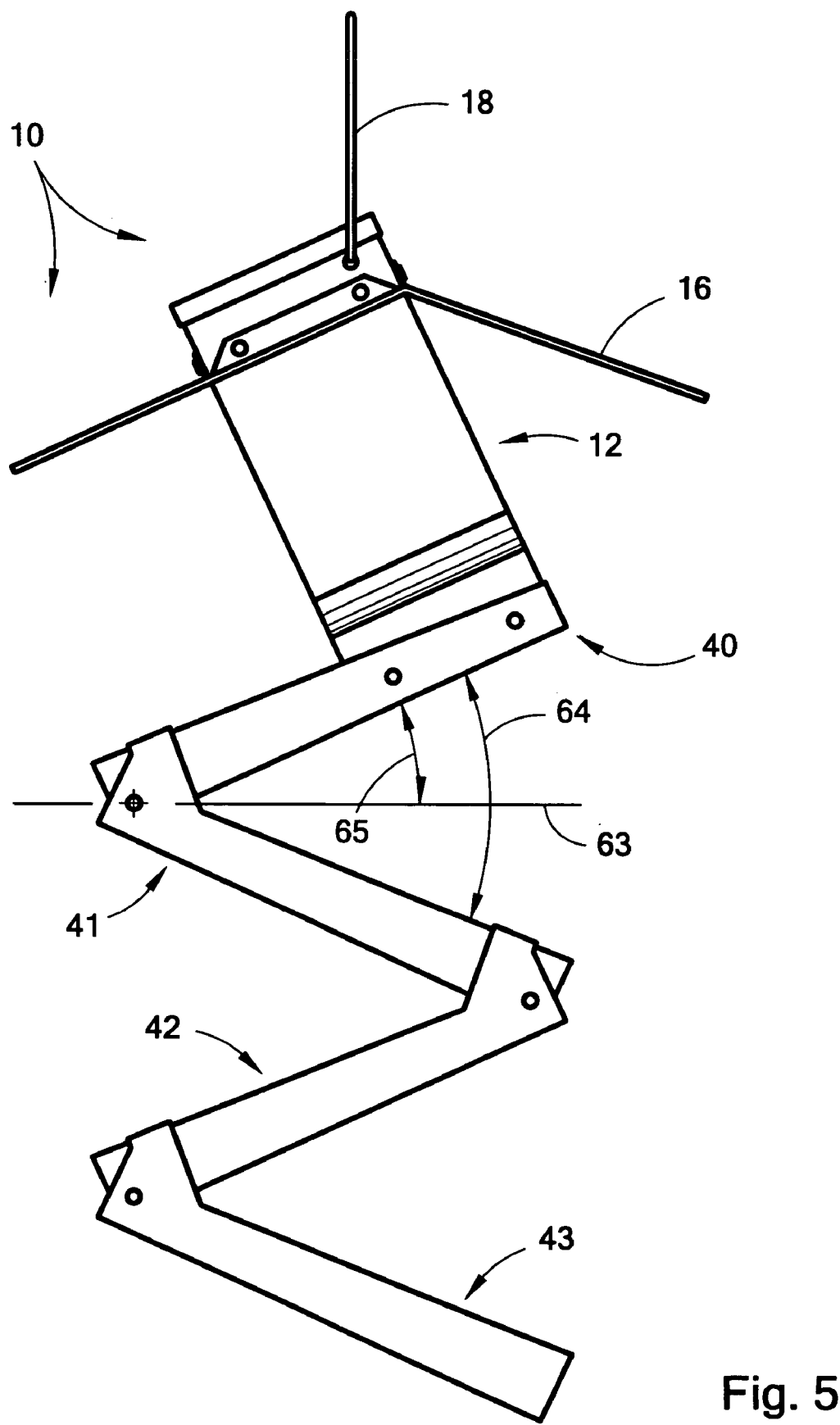
FIG. 5 is a fragmentary, front schematic view thereof.

Noting particularly FIG. 5, the preferred angle between a given ramp and the horizontal 63 (FIG. 5) has been designated by arrow 65. This angle, preferably between twenty-five and thirty degrees, is ideally slightly less than the "Angle of Repose" exhibited by the granular feed. The angle of repose is that angle from the horizontal that the surface of a granular substance makes when poured into a pile and allowed to flow in response to gravity. For bird seed products that I have measured, the angle of repose is between approximately thirty-four to thirty six degrees. Preferably the angle designated by arrow 65 is thirty degrees, to insure proper flow all of the way to the bottom ramp, without excess flow and resultant spilling and waste. Typical bird seed 49, seen traveling down the individual trough ramps in FIG. 3, is thus flowing over a surface angled approximately thirty degrees. Preferably, each ramp is angled relative to the horizontal approximately twenty-five to thirty degrees. In the best mode each ramp is angled thirty degrees, and angle 64 (FIG. 5) between successive ramps is twice that, or roughly sixty degrees. Further, in the best mode, the hanger 18 is placed such that the uppermost ramp attached beneath the hopper is angled at approximately thirty degrees as well. However, I have found that the hopper discharges feed adequately even when angled much less than thirty degrees.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An animal feeder comprising:
   a hopper for holding and outputting food; and,
   a feeding trough connected to the hopper that receives food discharged from the hopper, the trough comprising a plurality of separate, pivotally interconnected ramps that are foldable into a zigzag configuration when the trough is deployed;
   wherein the hopper comprises a feed outlet orifice proximate the trough; and,
   wherein the trough comprises an uppermost ramp fixedly secured to the hopper, a first intermediate ramp pivoted to the uppermost ramp, successive intermediate ramps pivoted to each other, and a lowermost ramp pivoted to the last intermediate ramp, and wherein the intermediate and uppermost ramps comprise a feed discharge hole for dropping food to a ramp beneath it.

2. The feeder as defined in claim 1 wherein each ramp comprises a pair of elongated, spaced apart sides, a confining surface bounded by said sides upon which feed flows, an innermost input end, and an output end.

3. The feeder as defined in claim 2 wherein the intermediate ramps and the lowermost ramps comprise projecting stops that contact adjacent ramps for limiting pivotal deflection of the ramps.

4. The feeder as defined in claim 3 wherein the stops comprise integral hooks that engage opposite sides of an upper, adjoining ramp to limit ramp rotation.

5. The animal feeder as defined in claim 3 further comprising:
   a generally planar canopy mounted atop the hopper for shielding the feeder; and,
   a hanger for angularly suspending the feeder above ground.

6. A collapsible bird feeder comprising:
   a hopper for holding and outputting bird food, the hopper having a feed outlet orifice for discharging food;
   a feeding trough connected to the hopper for receiving and distributing food from the hopper, the trough transformable between a retracted, low volume position and a deployed zigzag configuration, the trough comprising a plurality of separate, pivotally interconnected ramps that are foldable into a zigzag configuration when the trough is deployed, and,
   wherein the hopper comprises a feed outlet orifice proximate the trough.

7. The feeder as defined in claim 6 wherein the trough comprises an uppermost ramp fixedly secured to the hopper, a first intermediate ramp pivoted to the uppermost ramp, successive intermediate ramps pivoted to each other, and a lowermost ramp pivoted to the last intermediate ramp, and wherein the intermediate and uppermost ramps comprise a feed discharge hole for dropping food to a lower ramp.

8. The feeder as defined in claim 7 wherein the intermediate ramps and the lowermost ramps comprise projecting stops that contact an upper adjacent ramp for limiting pivotal deflection.

9. The feeder as defined in claim 6 wherein each ramp comprises a pair of elongated, spaced apart sides, a confining surface bounded by said sides upon which feed flows, an input end, and an output end, and wherein the uppermost and intermediate ramps comprise a feed discharge orifice defined in their output ends for dropping feed onto the ramp below it.

10. The feeder as defined in claim 9 wherein the intermediate ramps and the lowermost ramps comprise projecting stops that contact adjacent ramps for limiting pivotal deflection of the ramps.

11. The feeder as define in claim 10 wherein the stops comprise integral hooks that engage opposite sides of an upper, adjoining ramp to limit ramp rotation.

12. The feeder as defined in claim 6 wherein the preferred angle between successive ramps is approximately twice the angle of repose for the feed over a given ramp.

13. The feeder as defined in claim 12 wherein successive ramps form an angle of approximately sixty degrees relative to each other.

14. The feeder as define in claim 12 further comprising a hanger connected to the hopper for angularly suspending the feeder above ground, and a generally planar canopy mounted atop the hopper for shielding the feeder.

15. A zigzag bird feeder comprising:
   a hopper for holding and outputting bird food, the hopper having a feed outlet orifice for discharging food;
   a hanger connected to the hopper for angularly suspending the feeder above ground;
   a canopy mounted atop the hopper for shielding the feeder;
   a collapsible feeding trough connected to the hopper for receiving and distributing food from the hopper, the trough transformable between a retracted, low volume position and a deployed zigzag configuration, the trough comprising:
      an uppermost ramp fixedly secured to the hopper;
      a first intermediate ramp pivoted to the uppermost ramp;
      successive intermediate ramps pivoted to each other;
      a lowermost ramp pivoted to the last intermediate ramp; and,
      wherein the intermediate and uppermost ramps comprise a feed discharge hole for dropping food to a lower ramp; and,
   stops that contact ramps for limiting pivotal deflection of the ramps.

16. The feeder as defined in claim 15 wherein each ramp comprises a pair of elongated, spaced apart sides, a confining surface bounded by said sides upon which feed flows, an input end, and an output end, and wherein the uppermost and intermediate ramps comprise a feed discharge orifice defined in their output ends for dropping feed onto the ramp below it, and wherein the stops are formed on the intermediate ramps and the lowermost ramps for contacting ramps above said intermediate or lowermost ramps for limiting pivotal deflection.

* * * * *